(12) United States Patent
Li et al.

(10) Patent No.: US 10,814,743 B2
(45) Date of Patent: Oct. 27, 2020

(54) ENERGY MANAGEMENT SYSTEM AND METHOD FOR VEHICLE WITH HIGH POWER AND HIGH ENERGY BATTERY PACKS

(71) Applicant: GM Global Technology Operations LLC, Detroit, MI (US)

(72) Inventors: Wei Li, Troy, MI (US); Mark W. Verbrugge, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 346 days.

(21) Appl. No.: 15/877,414

(22) Filed: Jan. 23, 2018

(65) Prior Publication Data

US 2019/0225092 A1    Jul. 25, 2019

(51) Int. Cl.
*B60L 58/18* (2019.01)
*H01M 10/44* (2006.01)

(52) U.S. Cl.
CPC ........... *B60L 58/18* (2019.02); *H01M 10/441* (2013.01); *H01M 2220/20* (2013.01)

(58) Field of Classification Search
CPC . B60L 58/18; H01M 10/441; H01M 2220/20; H01M 10/482
USPC .......................... 320/103, 127, 128, 134–136
See application file for complete search history.

(56) References Cited

U.S. PATENT DOCUMENTS

| | | | |
|---|---|---|---|
| 9,579,963 B2 | 2/2017 | Landgraf | |
| 10,195,929 B2 | 2/2019 | Kusumi et al. | |
| 2013/0022851 A1 | 1/2013 | De Oliveira | |
| 2013/0030739 A1 | 1/2013 | Takahashi et al. | |
| 2013/0141045 A1* | 6/2013 | Karim | H02J 7/342 320/110 |
| 2014/0117716 A1 | 5/2014 | Patberg et al. | |
| 2014/0163854 A1 | 6/2014 | Matsumoto et al. | |
| 2014/0186659 A1 | 7/2014 | Dhar et al. | |
| 2015/0072196 A1 | 3/2015 | Soleski et al. | |
| 2015/0283964 A1 | 10/2015 | Janarthanam | |
| 2016/0347161 A1 | 12/2016 | Kusumi et al. | |
| 2017/0305253 A1 | 10/2017 | Perlo et al. | |

(Continued)

OTHER PUBLICATIONS

Robert Ball of Tata Motors European Technical Centre, "Traction Batteries Made up of Dissimilar Cells", ResearchGate Conference Paper published Jan. 2014, cover page along with pp. 1-6, United Kingdom.

(Continued)

*Primary Examiner* — Richard V Muralidar
(74) *Attorney, Agent, or Firm* — Quinn IP Law (57) ABSTRACT

An energy management system for a vehicle has a battery system including a first battery pack with a first set of battery cells and a second battery pack with a second set of battery cells. The first battery pack has a relatively high power density in comparison to the second battery pack, and the second battery pack has a relatively high energy density in comparison to the first battery pack. An electronic controller is operatively connected to the battery system and is configured to control charging and discharging of the first battery pack and the second battery pack. The first battery pack and the second battery pack are configured to be separately charged and discharged. The electronic controller prioritizes charging and discharging of the first battery pack over the second battery pack.

20 Claims, 6 Drawing Sheets

(56) References Cited

U.S. PATENT DOCUMENTS

2018/0072352 A1   3/2018  Shimoda
2018/0111501 A1   4/2018  Takeuchi et al.
2018/0208038 A1   7/2018  Ozawa et al.
2018/0370570 A1  12/2018  Ayukawa

OTHER PUBLICATIONS

Norio Takami, Keigo Hoshina, and Hiroki Inagaki of Toshiba Corporation, "Lithium Diffusion in $Li_{4/3}Ti_{5/3}O_4$ Particles during Insertion and Extraction", Journal of the Electrochemical Society, 158 (6) A725-A730, published Apr. 15, 2011, pp. A725-A730, Kawasaki, Japan.

Nathaniel S. Pearre, Willett Kempton, Randall L. Guensler, and Vetri V. Elango, "Electric Vehicles: How much range is required for a day's driving?", Elsevier Ltd. Transportation Research Part C, published Dec. 23, 2010, pp. 1171-1184, United Kingdom.

* cited by examiner

ENERGY MANAGEMENT SYSTEM AND METHOD FOR VEHICLE WITH HIGH POWER AND HIGH ENERGY BATTERY PACKS

INTRODUCTION

Electric vehicles may be propelled by electric motors that are powered solely by electrical energy provided by rechargeable batteries. Hybrid vehicles may also depend in part on rechargeable batteries for motive power. High power batteries are generally capable of fast charging and discharging. High energy batteries provide a longer driving range per unit of volume or weight than high power batteries, but are less able to quickly charge and recharge than high power batteries.

SUMMARY

A battery system having both a high power battery pack and a high energy battery pack is operated according to an energy management system to provide both a desirable driving range and extended cycle life of the high energy battery pack by limiting the charging and recharging cycles it undergoes during use, and by always charging and discharging the high energy battery pack separately from the high power battery pack.

An energy management system for a vehicle has a battery system including a first battery pack with a first set of battery cells and a second battery pack with a second set of battery cells. The first battery pack has a relatively high power density in comparison to the second battery pack, and the second battery pack has a relatively high energy density in comparison to the first battery pack. In an example embodiment, the first battery pack and the second battery pack are integrated in a single, unitary battery housing with the second set of battery cells adjacent the first set of battery cells.

An electronic controller is operatively connected to the battery system and is configured to control charging and discharging of the first battery pack and the second battery pack. The first battery pack and the second battery pack are configured to be separately charged and discharged. The electronic controller prioritizes charging and discharging of the first battery pack over the second battery pack.

The electronic controller may be configured to discharge only the first battery pack in response to a vehicle motive power demand if a state-of-charge of the first battery pack is greater than a predetermined minimum threshold state-of-charge, and discharge the second battery pack in response to the vehicle motive power demand only if the state-of-charge of the first battery pack is less than the predetermined minimum threshold state-of-charge. In one example, the predetermined minimum threshold state-of-charge of the first battery pack may be from about 10 percent to about 50 percent, and in one embodiment is 20 percent, of a charge capacity (i.e., a fully charged state) of the first battery pack. The electronic controller may be configured to terminate discharging of the first battery pack when the state-of-charge of the first battery pack falls to the predetermined minimum state-of-charge.

The energy management system may include a first switch controllable to move between an open position and a closed position, with the first battery pack operatively connected to a load or charge source when the first switch is closed, and disconnected from the load or charge source when the first switch is open. The energy management system may further include a second switch controllable to move between an open position and a closed position, with the second battery pack operatively connected to the load or charge source when the second switch is closed, and disconnected from the load or charge source when the second switch is open. The electronic controller may be operatively connected to the first switch and to the second switch, and configured to close the first switch and open the second switch when the state-of-charge of the first battery pack is greater than the predetermined minimum threshold state-of-charge.

In one or more embodiments, the electronic controller may be configured to close the second switch only if the state-of-charge of the first battery pack is less than the predetermined minimum threshold state-of-charge. During a vehicle driving mode, in which the second switch is closed and the first switch is open so that the high energy battery pack is discharging to the electric machine, the electronic controller may be configured to direct regenerative braking charge current above a charge current threshold of the second battery pack to a separate load or to the first battery pack rather than to the second battery pack.

In one or more embodiments, the first battery pack may be configured to provide a predetermined maximum driving range, and to charge to an 80 percent state-of-charge in a predetermined amount of time, and the second battery pack may be configured to provide a maximum driving range R, with units of miles:

$R = 500 - 1.8 * X$, where X is the maximum driving range in miles of the first battery pack and the maximum driving range of the vehicle is 500 miles.

A method of managing energy for a vehicle having the first battery pack and the second battery pack includes determining vehicle motive power demand, determining a state-of-charge of the first battery pack, discharging only the first battery pack in response to the vehicle motive power demand if the state-of-charge of the first battery pack is greater than a predetermined minimum state-of-charge, and discharging the second battery pack in response to the vehicle motive power demand only if the state-of-charge of the first battery pack is less than the predetermined minimum state-of-charge. In an example embodiment, only the second battery pack is discharged in response to the vehicle motive power demand if the state-of-charge of the first battery pack is less than the predetermined minimum state-of-charge.

The method may include terminating the discharging of the first battery pack in response to the vehicle motive power demand when the state-of-charge of the first battery pack falls to the predetermined minimum state-of-charge.

The method may include closing the first switch and opening the second switch when the state-of-charge of the first battery pack is greater than the predetermined threshold minimum state-of-charge. The method may include closing the second switch only if the state-of-charge of the first battery pack is less than the predetermined minimum threshold state-of-charge, and may further include opening the first switch when the state-of-charge of the first battery pack is less than the predetermined minimum state-of-charge.

During a vehicle driving mode, in which the second switch is closed and the first switch is open so that the high energy battery pack is discharging to the electric machine, the electronic controller may be configured to direct regenerative braking charge current above a charge current threshold of the second battery pack to a separate load or to the first battery pack rather than to the second battery pack.

With respect to charging of the hybrid battery pack from an external power source, the method may include receiving information indicative of a charging event, setting charging current to be at or below a predetermined value if charging current is above the predetermined value, wherein the predetermined value of the charging current is a current level accepted by the second battery pack, and charging the first battery prior to charging the second battery pack if a state-of-charge of the first battery pack is less than a predetermined maximum state-of-charge.

The above features and advantages and other features and advantages of the present disclosure are readily apparent from the following detailed description of the best modes for carrying out the disclosure when taken in connection with the accompanying drawings.

DETAILED DESCRIPTION

Figure 1:
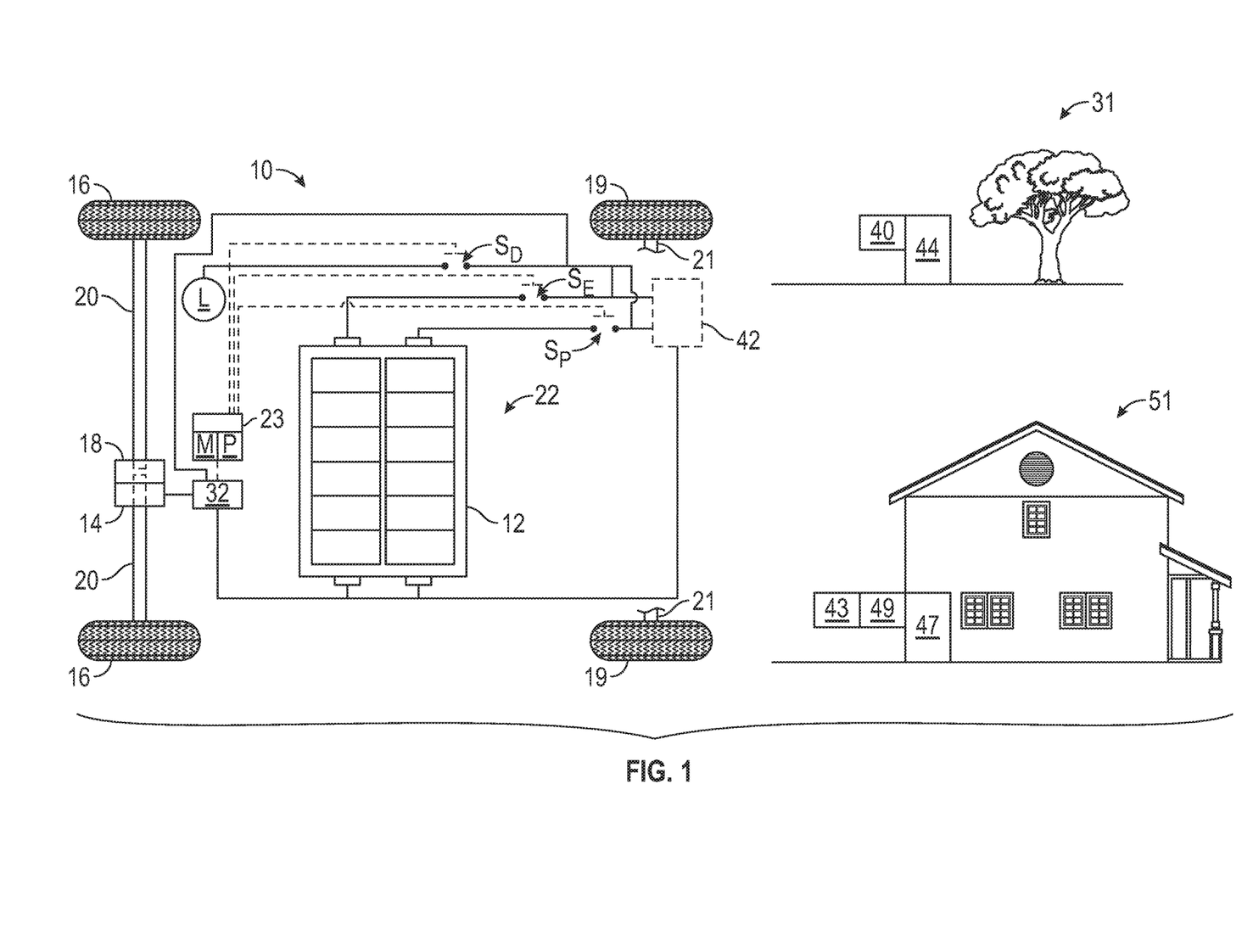
FIG. 1 is a schematic illustration of an electric vehicle having an energy management system with a hybrid battery pack, and showing a residential and fast charge station for the vehicle.

Referring to the drawings, wherein like reference numbers refer to like components throughout the views, FIG. 1 shows an electric vehicle 10. The electric vehicle 10 is powered solely by electric power provided from a hybrid battery pack 12 to one or more electric machines 14 that provide motive force to front vehicle wheels 16 and may be referred to as an "all-electric" vehicle. One electric machine 14 is shown operatively connected to front wheels 16 via a gearing arrangement 18 and half shafts 20. In various embodiments, an additional electric machine (not shown) may be similarly operatively connected to the rear wheels 19, an electric machine could be connected to the rear wheels 19 with no electric machine connected to the front wheels 16, or each wheel may be operatively connected to a separate electric machine. Rear half shafts 21 are shown in fragmentary view in FIG. 1. The electric machine 14 is configured to be operable as a motor during a driving mode of the vehicle 10, and as a generator such as during regenerative braking of the vehicle 10.

Although depicted on an electric vehicle 10, the hybrid battery pack 12, energy management system 22 and method 100 described herein may be applicable to a hybrid electric vehicle that utilizes the hybrid battery pack to power one or more electric motors for propulsion, and that also has an internal combustion engine as a source of motive power (e.g., a hybrid electric vehicle).

The hybrid battery pack 12 is part of an energy management system 22 and may be referred to as a "hybrid" battery pack as it integrates both a relatively high power (i.e., high power density) first battery pack 24 (referred to as a high power battery pack 24 or a power battery pack 24), and a relatively high energy (i.e., high energy density) second battery pack 26 (referred to as a high energy battery pack or an energy battery pack 26). More specifically, and with reference to FIG. 2, the hybrid battery pack 12 includes a housing 28 that supports and retains both the high power battery pack 24 and the high energy battery pack 26 in a single, unitary construction. The high power battery pack 24 includes a first set of battery cells 24A connected in series and/or parallel with one another (the high power battery cells 24A) and the high energy battery pack 26 includes a second set of battery cells 26A connected in series and/or parallel with one another (the high energy battery cells 26A) adjacent to the high power battery cells 24A in the housing 28.

The energy management system 22 includes an electronic controller 23 that executes an energy management method 100 of charging and discharging the hybrid battery pack 12 to enable a relatively long driving range while minimizing the number of charging cycles on the less durable high energy battery pack 26. Generally, the energy management system 22 prioritizes charging and discharging of the high power battery pack 24 over the high energy battery pack 26 in order to reduce the frequency of charge cycles of the high energy battery pack 26.

The electronic controller 23 may be used to control ongoing operation of the hybrid battery pack 12 via the transmission of control signals to switches $S_E$ and $S_P$ as described herein. The electronic controller 23 may be embodied as one or more electronic control units having a requisite memory M and a processor P, as well as other associated hardware and software, e.g., a clock or timer, input/output circuitry, etc. Memory M may include sufficient amounts of read only memory, for instance magnetic or optical memory. Instructions embodying the method 100 may be programmed as computer-readable instructions into the memory M and executed by the processor P during operation of the vehicle 10 to thereby optimize energy management.

The energy management system 22 is configured and the method 100 is designed so that the high power battery pack 24 is charged and discharged separately from the high energy battery pack 26. Stated differently, the high power battery pack 24 is not used to charge the high energy battery pack 26, the high energy battery pack 26 is not used to charge the high power battery pack 24, the high power battery pack 24 may be discharged without discharging the high energy battery pack 26, and the high energy battery pack 26 may be discharged without discharging the high power battery pack 24.

The high energy battery pack 26 has a relatively high energy density in comparison to the high power battery pack 24 (i.e., energy per unit of weight or per unit of size, such as in kilowatt-hours per kilogram (kWh/kg) or kilowatt-hours per liter (kWh/l)), and extends the range of the vehicle 10 in comparison to a battery system having the high power battery pack 24 but not the high energy battery pack 26. The high energy battery pack 26 may have a high internal resistance, limiting its ability to accept high current to charge quickly. For example, the high energy battery pack 26 may have an energy density in kilowatt-hours per kilogram or per liter at least 50% greater than the energy density of the high power battery pack. In one embodiment, the high energy battery pack 26 includes Lithium-metal based energy battery cells 26A with 400 Wh/kg energy density, and the high power battery pack 24 includes lithium-titanate based battery cells 24A of about 100 Wh/kg energy density. In this case, the high energy battery pack 26 has about 300% greater specific energy relative to the high power battery pack 24. In another embodiment, the high energy battery pack 26 includes Lithium-Ion based energy battery cells 26A with 250 Wh/kg energy density, and the high power battery pack 24 includes Lithium-Ion based battery cells 24A of about 150 Wh/kg energy density. In this case, the high energy battery pack 26 has about 67% greater specific energy relative to the high power battery pack 24.

The high power battery pack 24 has a relatively high power density in comparison to the high energy battery pack 26 (i.e., power per unit of size or per unit of weight, such as in kilowatts per kilogram or per liter). For example, the high power battery pack 24 may have a power density in kilowatts per kilogram or per liter at least 100% greater than the power density of the high energy battery pack 26. Using allowable charging rate as a rough estimate of the power density of the battery packs 24, 26, in an embodiment, the high power battery pack 24 includes battery cells 24A that can charge at the 4 C rate for 80% state-of-charge (SOC), and the high energy battery pack 26 includes battery cells 26A that can typically charge at about the C/3 rate. The 1 C rate corresponds to the current needed to charge the battery from a fully discharged state to the fully charged state in one hour. The 4 C rate corresponds to the current needed to charge the battery from a fully discharged state to the fully charged state in one quarter of an hour, or 15 minutes. In this embodiment, the high power battery pack 24 thus has roughly 1100% greater power density than the high energy battery pack 26.

The high power battery pack 24 has the advantage of an ability to accept higher current during charging than the high energy battery pack 26, enabling what may be referred to as a "fast" charge that may be obtained from a charge source 31 (also referred to as a charge station, shown in FIG. 1) configured to provide relatively high current and that may be, for example, a public charging station rather than a private residence. Access to such a charge source 31 enables the vehicle 10 to continue a driving excursion, and provides a quicker partial or full recharge of the high power battery pack 24, as explained herein.

The high power battery cells 24A are connected in parallel and/or series with one another and are constructed to provide or are composed of materials that provide greater power than the high energy battery cells 26A, and the battery pack 24 is therefore referred to as the high power battery pack or simply the power battery. Example materials for the high power battery pack 24 include battery cells with a negative electrode comprising one or more of a lithium titanate ($Li_{4+x}Ti_5O_{12}$, where 0≤x≤3), and various other Li—Ti—O materials (including Li—Ti—Sc—O, Li—Ti—Nb—O, and Li—Ti—Zn—O), or graphite, and a positive electrode comprising one or more of a nickel manganese cobalt oxide ($Ni_xMn_yCo_zO_2$, where the sum of x, y, and z is one), lithium manganese oxide ($LiMn_2O_4$ (spinel)), nickel manganese cobalt oxide (NMC), lithium nickel manganese cobalt oxide ($LiNiMnCoO_2$), and lithium iron phosphate ($LiFePO_4$).

The high energy battery cells 26A are connected in series and/or parallel with one another and are composed of materials that provide greater energy than the high power battery cells 24A, and the battery pack 26 is therefore referred to as the high energy battery pack or simply the energy battery. Example materials for the high energy battery pack 26 include battery cells with a negative electrode comprising one or more of graphite, or of silicon, or of silica, or of rechargeable lithium metal, and a positive electrode comprising one or more of a nickel manganese cobalt oxide ($Ni_xMn_yCo_zO_2$, where the sum of x, y, and z is one), lithium manganese oxide ($LiMn_2O_4$ (spinel)), nickel manganese cobalt oxide (NMC), lithium nickel manganese cobalt oxide ($LiNiMnCoO_2$), lithium iron phosphate ($LiFePO_4$), or a sulfur-based positive electrode.

The high power battery pack 24 may be configured to provide a predetermined maximum range of the vehicle 10 when fully charged, and to be able to receive an amount of power equivalent to a predetermined fraction of that maximum range during a fast charge (i.e., relatively high current charging) of a predetermined duration. For example, the high power battery pack 24 may be configured to provide a predetermined maximum range of 150 miles when fully charged, and to be able to receive an amount of power equivalent to 80 percent of the range (i.e., 120 miles) in a 15-minute fast charge. The high power battery pack 24 alone thus provides 270 miles of driving range if discharged from a fully charged state and then given one fast charge to 80 percent of the maximum state of charge. Miles of vehicle travel are converted to battery capacity in kilowatt-hours based on vehicle energy consumption per mile. For example, the vehicle 10 may consume energy at a rate of 250 watt-hours per mile.

The high energy battery pack 26 is configured in light of this configuration of the high power battery pack 24 so that the hybrid battery pack 12 yields a predetermined maximum driving range. For example, the hybrid battery pack 12 may be configured to provide a maximum driving range of 500 miles, which is greater than or equal to the typical daily mileage of 75 percent of drivers on 361 days of the year. Considering the 270 mile range of the high power battery pack 24 including one fast charge to 80 percent state-of-charge, the high energy battery pack 26 is thus configured to have a 230 mile driving range.

Figure 3:
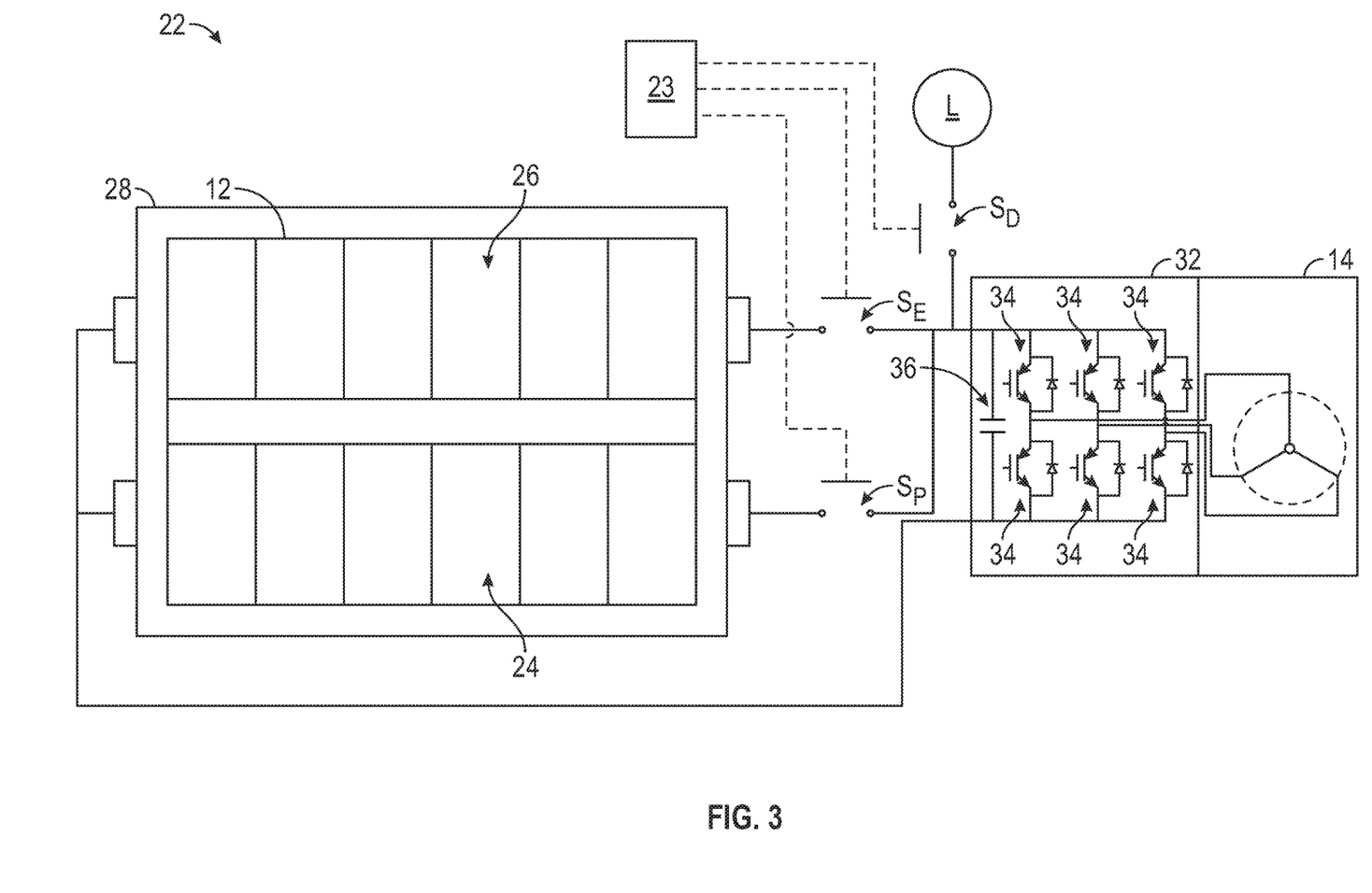
FIG. 3 is a schematic illustration of the portion of the energy management system of FIG. 2 during a driving mode.

The nominal voltage of the high power battery pack 24 and the high energy battery pack 26 need not be the same, and they could have a different end of charge voltage (Vmax) and/or a different end of discharge voltage (Vmin). To use the same power inverter 32 between the electric machine 14 and the battery packs 24, 26, as shown in FIGS. 1 and 3, however, the nominal voltage of both battery packs 24, 26 should be between about 250 and 500 volts (enabling the use of the same insulated gate bipolar transistors (IGBTs)). For both battery packs 24, 26, the end of discharge voltage Vmin should be above a predetermined fraction of an end of charge voltage, such as about 0.55 of the end of charge voltage. Stated differently:

Vmin>0.55*Vmax, where Vmax is the end of charge voltage of the respective battery pack. This ensures sufficiently high energy efficiency of the IGBTs.

Figure 2:
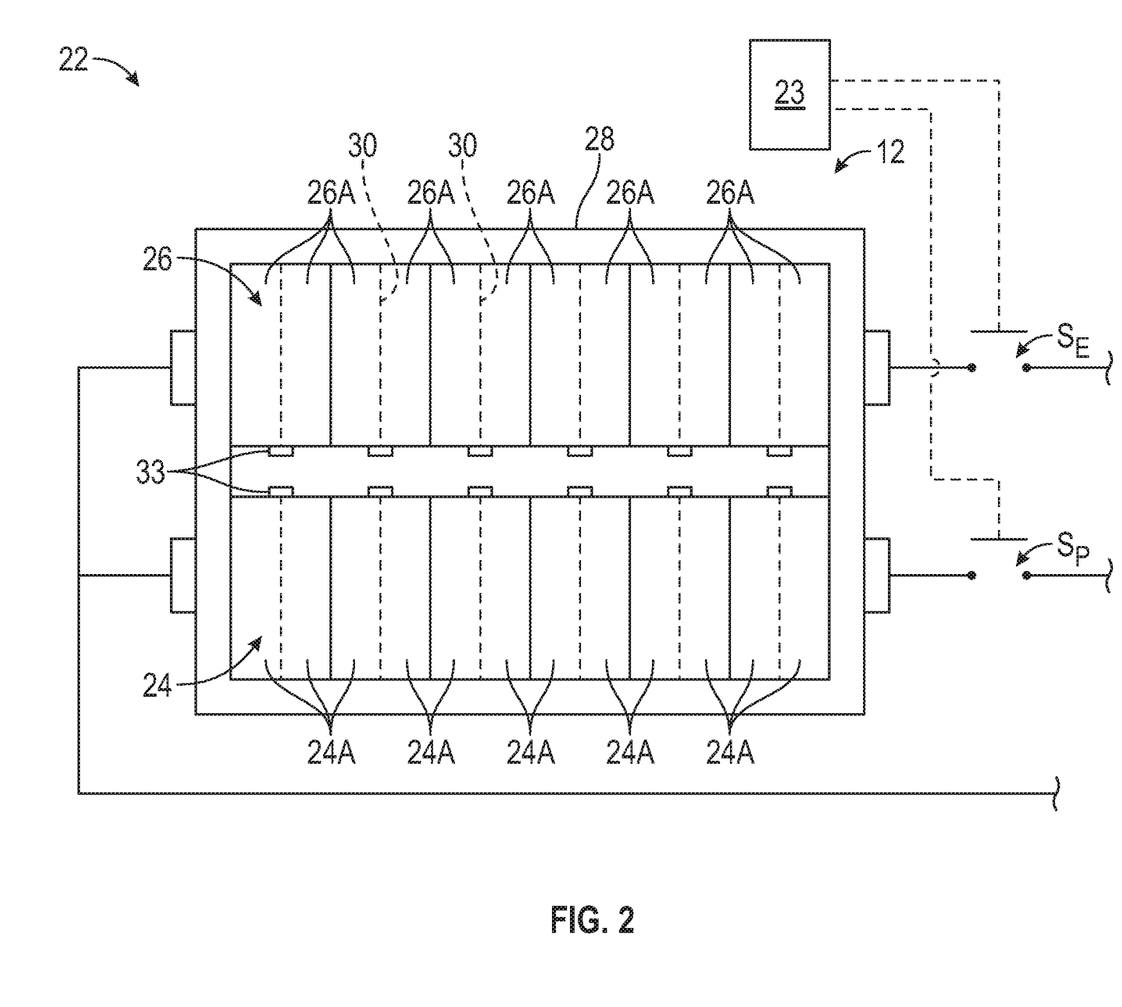
FIG. 2 is a schematic illustration of a portion of the energy management system of FIG. 1, including the hybrid battery pack.

With reference to FIG. 2, each battery cell 24A, 26A includes an anode and a cathode (indicated on either side of a membrane 30 shown with dashed lines). One or more sensors 33 are in operative communication with each battery cell 24A, 26A and are operatively connected to the electronic controller 23 either directly or via a battery module controller (not shown). Selected ones of the membranes 30 and sensors 33 are indicated with reference numerals in FIG. 2 for clarity in the drawing. The sensors 33 are configured to monitor battery parameters during vehicle operation. For example, the sensors 33 may monitor parameters indicative of the respective state-of-charge of each battery cell 24A, 26A, such as voltage, current, temperature, etc. The electronic controller 23, or another controller operatively connected to the electronic controller 23, may include a stateof-charge estimator module that determines a state-of-charge based on the sensor data.

With reference to FIG. 2, the energy management system 22 includes a first switch $S_P$ operatively connected to the high power battery pack 24, and a second switch $S_E$ operatively connected to the high energy battery pack 26. The first switch $S_P$ is also referred to as the power battery pack switch, and the second switch $S_E$ is also referred to as the high energy battery pack switch. When the first switch $S_P$ is open, the high power battery pack 24 is disconnected from the electric machine 14 and from the charge port 42. When the first switch $S_P$ is closed, the high power battery pack 24 is operatively connected to the electric machine 14 (during drive mode) and to the charge port 42 (during charge mode). When the second switch $S_E$ is open, the high energy battery pack 26 is disconnected from the electric machine 14 and from the charge port 42. When the second switch $S_E$ is closed, the high energy battery pack 26 is operatively connected to the electric machine 14 (during drive mode) and to the charge port 42 (during charge mode).

The first switch $S_P$ and the second switch $S_E$ are both shown in open positions in FIG. 2. The electronic controller 23 is operatively connected to each of the switches $S_E$ and $S_P$, and is configured to selectively send a separate control signal to each of the switches $S_E$ and $S_P$ so that the switches $S_E$ and $S_P$ may be moved from the open position to a closed position (represented with dashed lines) independently of one another. Under the method 100 discussed herein, both switches $S_E$ and $S_P$ could be placed in the open position, both could be placed in the closed position, the first switch $S_P$ could be placed in the open position and the second switch $S_E$ could be placed in the closed position, and the first switch $S_P$ could be placed in the closed position and the second switch $S_E$ could be placed in the open position.

FIGS. 1 and 3 show the electric machine 14 (i.e., a load) that may be driven by or charged by either or both of the high power battery pack 24 and the high energy battery pack 26 depending on the respective positions of the first and second switches $S_E$ and $S_P$. The electric machine 14 is depicted as an alternating current (AC) motor. A power inverter 32 is shown disposed between the electric machine 14 and the switches $S_E$, $S_P$. The power inverter 32 is depicted as a three-phase power inverter with gate drives 34 and a capacitive input filter 36. The power inverter 32 converts direct current (DC) provided from the high power battery pack 24 and/or the high energy battery pack 26 to alternating current (AC) for driving the electric machine 14 as a motor, and converts alternating current to direct current when functioning as a generator during regenerative braking.

The energy management system 22 may also include a diverting switch SD that is operatively connected to the electronic controller 23, and is movable from an open position (shown) to a closed position by a control signal sent from the electronic controller 23. In the closed position of the diverting switch SD, current generated by the electric machine 14 during operation as a generator in a regenerative braking mode is diverted to a separate load L on the vehicle, such as an electrically-powered vehicle accessory, rather than to either or both of the battery packs 24, 26. For example, when the high energy battery pack 26 is discharging to the electric machine 14 (i.e., when the first switch $S_P$ is open and the second switch $S_E$ is closed) and a regenerative braking event occurs, the controller may direct regenerative braking charge current above a charge current threshold of the high energy battery pack 26 to load L by closing the diverting switch SD to direct the braking charge current to the load L rather than to the high energy battery pack 26. This scheme may be used to avoid high currents that can damage the energy cells.

Figure 4:
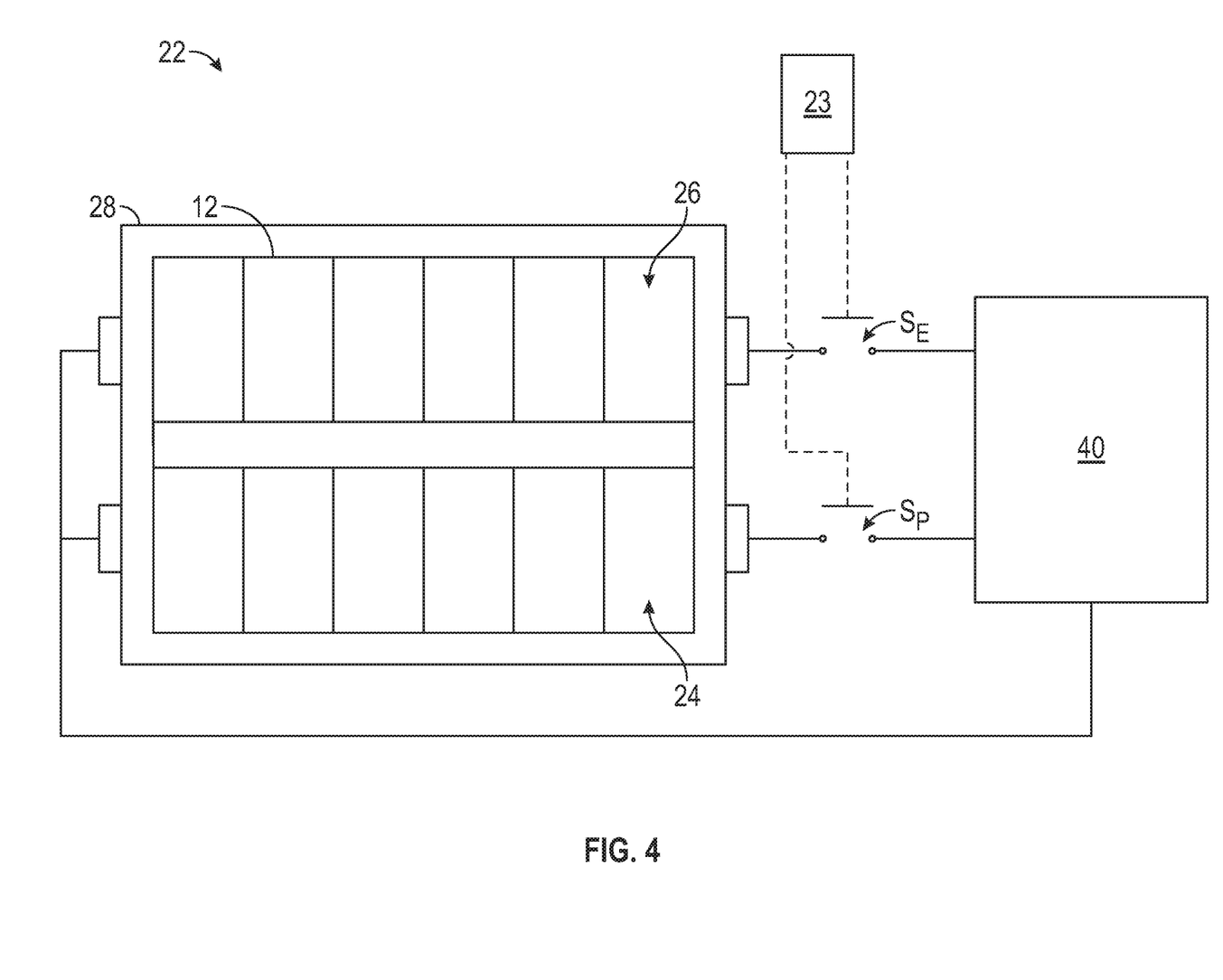
FIG. 4 is a schematic illustration of the portion of the energy management system of FIG. 2 during a charging mode.
Figure 6:
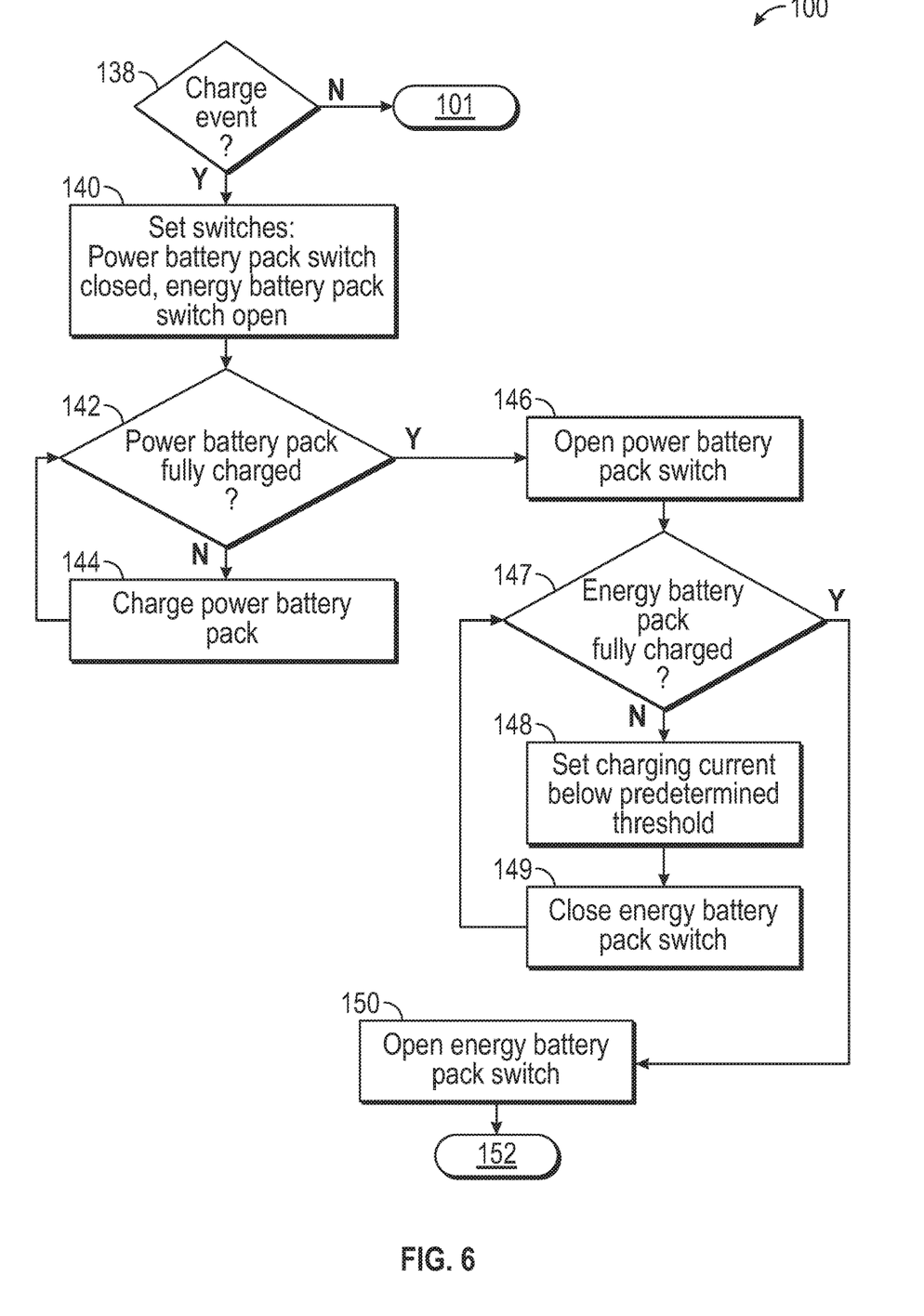
FIG. 6 is a flowchart of the energy management method for the energy management system during the charging mode.

FIG. 4 shows a fast charging device 40 that may be placed at the charge port 42 of FIG. 1 to operatively connect a power supply 44 to the energy management system 22 for recharging the high power battery pack 24 and/or the high energy battery pack 26 according to the energy management method 100 carried out by the electronic controller 23 as discussed with respect to FIG. 6.

Figure 5:
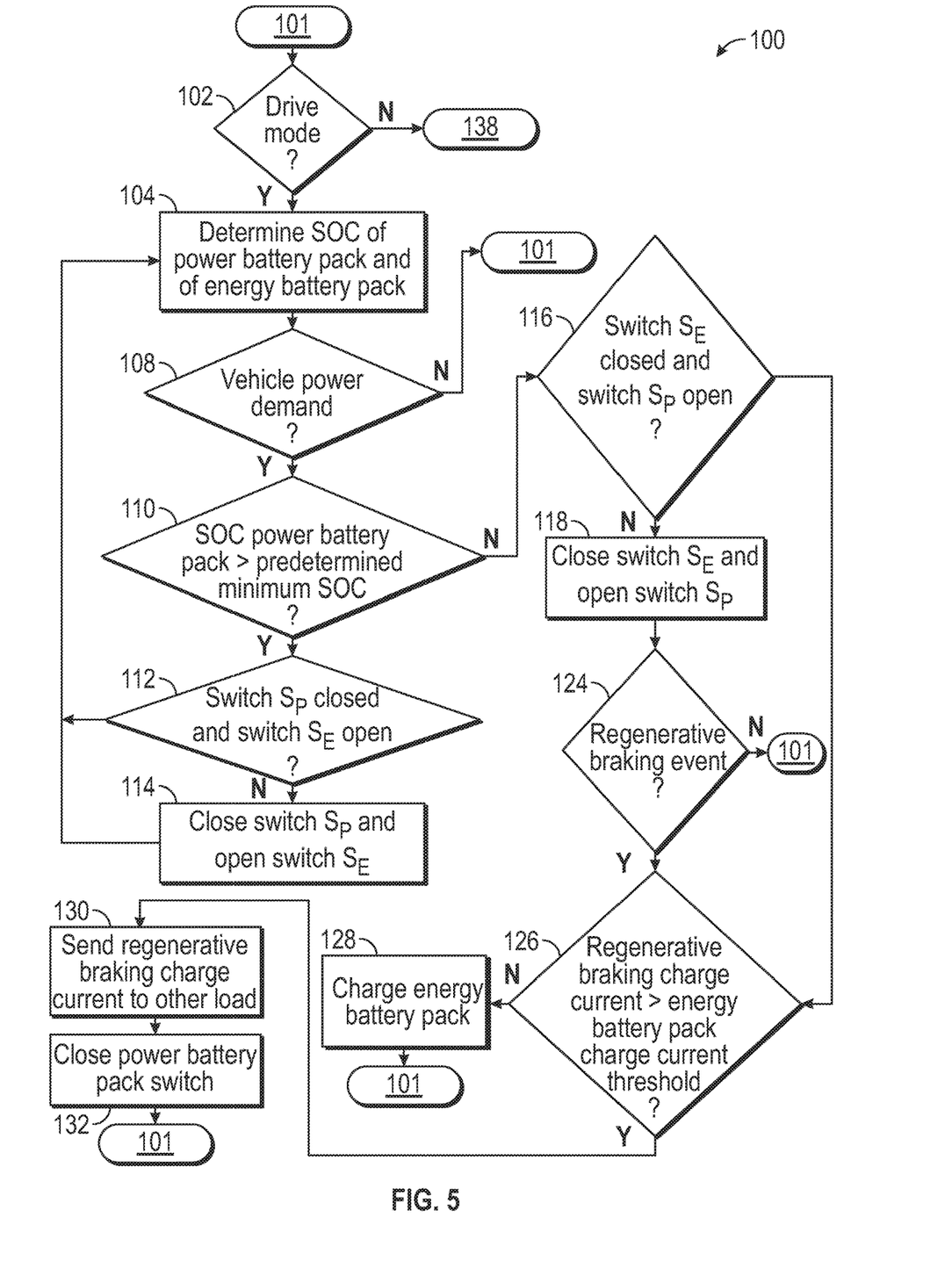
FIG. 5 is a flowchart of an energy management method for the energy management system during the driving mode.

FIG. 5 shows a flow diagram of a method 100 of managing energy for the electric vehicle 10. The method 100 is a set of stored instructions stored on the electronic controller 23 and executed by processor P of the electronic controller 23. The method 100 begins at start 101 and proceeds to step 102, in which the electronic controller 23 determines whether the vehicle 10 is in drive mode. Drive mode is a mode in which the vehicle 10 utilizes energy from the hybrid battery pack 12 to propel the vehicle 10 (i.e., the hybrid battery pack 12 is discharging), and includes when the vehicle 10 is at a temporary stop during propulsion, and periods of regenerative braking in which the high power battery pack 24 and/or the high energy battery pack 26 may be charged, as opposed to an extended park or off mode in which the vehicle 10 is not propelled and the hybrid battery pack 12 is not discharging. The electronic controller 23 determines whether the vehicle 10 is in drive mode based on one or more vehicle operating conditions or parameters, such as the selection of drive mode by a vehicle operator pushing a button or shifting a lever, wheel speed sensors, etc.

If the electronic controller 23 determines in step 102 that the vehicle 10 is in drive mode, then the method 100 proceeds to step 104. If the electronic controller 23 determines in step 102 that the vehicle 10 is not in drive mode, then the method 100 proceeds to step 138 shown in FIG. 6, discussed hereinafter. In the drawings, "Y" represents an affirmative answer to a query, and "N" represents a negative answer.

In step 104, the electronic controller 23 determines the state-of charge of the high power battery pack 24 and the state-of-charge of the high energy battery pack 26. The states-of-charge of the battery packs 24, 26 may be determined based on data received from the sensors 33. The method 100 then proceeds to step 108, in which the electronic controller 23 determines vehicle motive power demand. The electronic controller 23 may determine vehicle motive power demand based on vehicle operating parameters received as input signals by the electronic controller 23. The vehicle motive power demand is the amount of electrical power required by the one or more electric machines 14 to meet vehicle operator speed and acceleration commands. For example, depression or lifting of an accelerator pedal, the rate of depression or lifting of the pedal, depression or lifting of a braking pedal, the rate of depression or lifting of the braking pedal, and wheel speed data may be used by the electronic controller 23 to determine the vehicle motive power demand. If the vehicle motive power demand determined in step 108 is non-zero, (i.e., the electric machine 14 is required to function as a motor), then electrical power is required from the hybrid battery pack 12, and the method 100 proceeds to step 110. However, if the vehicle power demand is zero, the method 100 returns to start 101.

In step 110, the electronic controller 23 determines whether the state-of-charge of the high power battery pack 24 is greater than a predetermined minimum state-of-charge of the high power battery pack 24. For example, the predetermined minimum state-of-charge of the high power battery pack 24 may be at or near zero, or may be a non-zero value, such as from about 10 percent to about 50 percent, and in one embodiment is 20 percent, of the maximum state-of-charge of the high power battery pack 24, in order to preserve battery power such as for relatively high acceleration or other relatively high power demands.

If the state-of-charge of the high power battery pack 24 is above the predetermined minimum state-of-charge, then the method 100 proceeds to step 112 in order to use the high power battery pack 24 to meet the vehicle power demand. In this manner, the method 100 prioritizes discharging of the high power battery pack 24 over the high energy battery pack 26. In step 112, the electronic controller 23 determines whether the first switch $S_P$ is in the closed position and the second switch $S_E$ is in the closed position. If the first switch $S_P$ is not in the closed position or the second switch $S_E$ is not in the open position, the method 100 moves to step 114 to close the first switch $S_P$ and/or open the second switch $S_E$ as needed to allow the high power battery pack 24 to discharge to the electric machine 14 through the power inverter 32 by powering the electric machine 14 as a motor to meet vehicle power demand. The method 100 then returns to step 104. If the electronic controller 23 determines that there is a regenerative braking event while the first switch $S_P$ is closed and the second switch $S_E$ is open during driving mode, the regenerative braking energy will be directed to the high power battery 24.

If in step 110 the electronic controller 23 determines that the state-of-charge of the high power battery pack 24 is not greater than the predetermined minimum state-of-charge, then the high power battery pack 24 will be unable to meet the vehicle motive power demand, and the method 100 moves to step 116 to determine whether the second switch $S_E$ is in the closed position and the first switch $S_P$ is in the open position. If the second switch $S_E$ is not in the closed position or the first switch $S_P$ is not in the open position, the method 100 moves to step 118 to close the second switch $S_E$ and/or open the first switch $S_P$ as needed. The energy battery pack 26 is thus now operatively connected to the electric machine 14 and discharged to the electric machine 14 through the power inverter 32 by powering the electric machine 14 as a motor to meet vehicle power demand for the remainder of the vehicle trip.

If regenerative braking event occurs while the high energy battery pack 26 alone is being used to power the electric machine, the method 100 may include one or more of steps 124 to 132 to manage energy. In step 124, the electronic controller 23 determines whether vehicle operating conditions support a regenerative braking event. For example, lifting of an accelerator pedal, the rate of lifting of the accelerator pedal, depression of a braking pedal, the rate of depression of the braking pedal, and wheel speed data may be used by the electronic controller 23 to determine whether regenerative braking is warranted. If the monitored vehicle operating parameters do not indicate that regenerative braking is warranted, then the method 100 returns to the start 101, and the logic of steps 102-110 will cause vehicle power demand to continue to be met by discharge from the energy battery pack 26, unless regenerative braking current via optional step 132 discussed below has charged the high power battery pack 24 above the predetermined minimum state-of-charge.

If, however, the vehicle operating parameters indicate that regenerative braking is warranted, then the method 100 moves to step 126 and determines whether a regenerative braking charge current is greater than a charge current threshold of the high energy battery pack 26. The charge current threshold of the high energy battery pack 26 may be determined based on a predetermined fraction of the current needed to charge the high energy battery pack 26, if empty, to full charge. For example, the charge current threshold may be set at one-third of the current required to charge the high energy battery pack 26 to full charge from empty in a predetermined amount of time.

If it is determined in step 126 that the regenerative braking charge current is not greater than the charge current threshold of the high energy battery pack 26, then the method 100 moves from step 126 to step 128, in which regenerative braking energy is used to charge the high energy battery pack 26. Following step 128, the method 100 returns to start 101.

If it is determined in step 126 that the regenerative braking current is greater than the charge current threshold of the high energy battery pack 26, then the method 100 moves from step 126 to step 130, in which regenerative braking energy is directed to another vehicle load L to power the load. This may require closing a diverting switch SD. The second switch $S_E$ may remain open, as the current will follow the path of least resistance to the load L, or may be closed. In example embodiments, the load L may be a windshield heater or other electrical accessory to which regenerative braking energy may be directed, or simply a large resistor which dissipates the regenerative braking energy.

In addition to or as an alternative to step 130, when the regenerative braking current is greater than the charge current threshold of the high energy battery pack 26, then the method 100 may move from step 130 to step 132 (if both step 130 and 132 are to be performed), or directly from step 126 to step 132, if step 130 is not to be performed (such as if the windshield heater of other vehicle load is not in use and therefore not in need of electrical power). In step 132, the electronic controller 23 closes the first switch $S_P$ and opens the second switch $S_E$ for the duration of the regenerative braking event, so that at least a portion of the regenerative braking energy is directed to the high power battery pack 24 to charge the high power battery pack 24. The high power battery pack 24 may be equipped with break under load contactors that will open and disconnect from the regenerative breaking current at a specified current level to protect the high power battery pack 24. Additionally or alternatively, a DC/DC converter may be used in this instance to modify the voltage and current level from the regenerative braking current to the high power battery pack 24. In the event that both step 130 and step 132 are to be performed, a portion of the regenerative braking energy is directed to the vehicle load, and a portion is directed to the high power battery pack 24 to charge the high power battery pack 24.

As discussed with respect to FIG. 5, if in step 102 the electronic controller 23 determines that the vehicle 10 is not in drive mode, the method 100 moves to step 138, best shown in FIG. 6, and determines whether information indicative of a charge event is received. For example, with reference to FIG. 1, placement of a charging device at the charging port 42 is indicative of a charge event. Charging devices include the fast charging device 40 or a home charging device 43 which provides current through a DC converter 49 connected to an AC charge source 47, such as may be available at an operator's home 51 for overnight charging.

If the electronic controller 23 determines in step 138 that information indicative of a charging event has not been received, then the method 100 returns to the start at 101. If the electronic controller 23 determines in step 138 that it has received information indicative of a charging event, then the method 100 moves to step 140 and initially sets the high power battery switch $S_P$ to closed and the high energy battery switch $S_E$ to open if either switch is not already in these respective positions. Moving the switches in step 140 completes the charging circuit to the high power battery pack 24 and charging of the high power battery pack 24 begins. In this manner, the method 100 prioritizes charging of the high power battery pack 24 over the high energy battery pack 26.

Following step 140, the method 100 moves to step 142 and determines whether the high power battery pack 24 is fully charged (i.e., charged to its predetermined maximum state-of-charge). If the high power battery pack 24 is not at the predetermined maximum state-of-charge, then the method 100 continues in step 144 to charge the high power battery pack 24, periodically checking the state-of-charge, until it is determined in step 140 that the high power battery pack 24 has reached its predetermined maximum state of charge.

Once the high power battery pack 24 has been charged to its predetermined maximum state-of-charge, the method 100 moves to step 146 and opens the power battery switch $S_P$. The method 100 then moves to step 147 and determines whether the high energy battery pack 26 is fully charged (i.e., is charged to its predetermined maximum state-of-charge). If the high energy battery 26 is not fully charged, the method 100 may first check and set the charging current to be at or below a predetermined value in step 148 if charging current is above the predetermined value. The predetermined value of the charging current is a current level accepted by the second battery pack, as the high energy battery pack 26 is not able to accept current as high as that which the high power battery pack 24 can accept. The method 100 then moves to step 149 and closes the energy battery switch $S_E$. The method 100 then continues to charge the high energy battery pack 26, periodically checking the state-of-charge, until it is determined in step 147 that the high energy battery pack 26 has reached its predetermined maximum state of charge. Once the high energy battery pack 26 has reached its maximum state-of-charge, the method 100 moves to step 150 and opens the high energy battery switch $S_E$. Both the high power battery pack 24 and the high energy battery pack 26 are now fully charged, and the method 100 ends at 152.

The method 100 provides an energy management strategy for the electric vehicle 10 that optimizes the vehicle range while preserving the cycle life of the high energy battery pack 26. As described, steps 102-118 of the method 100 provide a discharging strategy during vehicle driving that minimizes the discharging of the high energy battery pack 26 by discharging the high power battery pack 24 first when possible. Steps 124-132 of the method 100 provide a regenerative braking charging strategy that minimizes charging of the high energy battery pack 26. Steps 138-150 provide a charging strategy that minimizes charging of the high energy battery pack 26, whether during a relatively fast charge (e.g., a charge that extends the range of the vehicle during use and tends to be higher current than an at-home charge) or a relatively slow charge (e.g., an at home, overnight charge). The method 100 and the energy management system 22 are configured to enable a relatively long driving range, while preserving the cycle life of the high energy battery pack 26. Charge and discharge is of the high power battery pack 24 first, limiting the number of charge cycles of the high energy battery pack 26.

While the best modes for carrying out the disclosure have been described in detail, those familiar with the art to which this disclosure relates will recognize various alternative designs and embodiments for practicing the disclosure within the scope of the appended claims.

What is claimed is:

1. An energy management system for a vehicle, comprising:
   a battery system including a first battery pack with a first set of battery cells and a second battery pack with a second set of battery cells; wherein the first battery pack has a relatively high power density in comparison to the second battery pack, and the second battery pack has a relatively high energy density in comparison to the first battery pack;
   a first switch controllable to move between an open position and a closed position; wherein the first battery pack is operatively connected to a load or charge source when the first switch is closed, and is disconnected from the load or charge source when the first switch is open;
   a second switch controllable to move between an open position and a closed position; wherein the second battery pack is operatively connected to the load or charge source when the second switch is closed, and is disconnected from the load or charge source when the second switch is open;
   a third switch controllable to move between an open position and a closed position; wherein a separate load is operatively connected to a regenerative braking charge current when the third switch is closed, and is disconnected from the regenerative braking charge current when the third switch is open;
   an electronic controller operatively connected to the first switch, the second switch, the third switch, and the battery system and configured to control charging and discharging of the first battery pack and the second battery pack;
   wherein the first battery pack and the second battery pack are configured to be separately charged and discharged;
   wherein the electronic controller prioritizes charging and discharging of the first battery pack over the second battery pack; and
   wherein, during a vehicle driving mode, the electronic controller is configured to close the third switch to direct the regenerative braking charge current above a charge current threshold of the second battery pack to the separate load rather than to the second battery pack, and the separate load is different than the load and different than the first battery pack.

2. The energy management system of claim 1, wherein the electronic controller is configured to:
   discharge only the first battery pack in response to a vehicle motive power demand if a state-of-charge of the first battery pack is greater than a predetermined minimum threshold state-of-charge; and
   discharge the second battery pack in response to the vehicle motive power demand only if the state-of-charge of the first battery pack is less than the predetermined minimum threshold state-of-charge.

3. The energy management system of claim 2, wherein the predetermined minimum threshold state-of-charge of the first battery pack is from about 10 percent to about 50 percent of a charge capacity of the first battery pack.

4. The energy management system of claim 2, wherein the electronic controller is configured to terminate discharging of the first battery pack when the state-of-charge of the first battery pack falls to the predetermined minimum threshold state-of-charge.

5. The energy management system of claim 2, wherein the electronic controller is configured to close the first switch and open the second switch when the state-of-charge of the first battery pack is greater than the predetermined minimum threshold state-of-charge.

6. The energy management system of claim 5, wherein the electronic controller is configured to close the second switch only if the state-of-charge of the first battery pack is less than the predetermined minimum threshold state-of-charge.

7. The energy management system of claim 1, wherein, during the vehicle driving mode, the electronic controller is further configured to close the first switch and open the second switch to direct the regenerative braking charge current above the charge current threshold of the second battery pack to the first battery pack rather than to the second battery pack.

8. The energy management system of claim 1, wherein:
the first battery pack is configured to provide a maximum driving range, and to charge to an 80 percent state-of-charge in a predetermined amount of time; and
the second battery pack is configured to provide a maximum driving range R in miles:
R=500−1.8*X, where X is the maximum driving range in miles of the first battery pack.

9. The energy management system of claim 1, wherein the first battery pack and the second battery pack are integrated in a single, unitary battery housing with the second set of battery cells adjacent the first set of battery cells.

10. A method of managing energy for a vehicle having a first battery pack and a second battery pack, the method comprising:
determining vehicle motive power demand;
determining a state-of-charge of the first battery pack; wherein the first battery pack has a relatively high power density in comparison to the second battery pack, and the second battery pack has a relatively high energy density in comparison to the first battery pack;
discharging only the first battery pack in response to the vehicle motive power demand if the state-of-charge of the first battery pack is greater than a predetermined minimum threshold state-of-charge;
discharging the second battery pack in response to the vehicle motive power demand only if the state-of-charge of the first battery pack is less than the predetermined minimum threshold state-of-charge;
wherein a first switch is controllable to move between an open position and a closed position, the first battery pack is operatively connected to a load or charge source when the first switch is closed, and is disconnected from the load when the first switch is open;
wherein a second switch is controllable to move between an open position and a closed position, the second battery pack is operatively connected to the load or charge source when the second switch is closed, and is disconnected from the load when the second switch is open; and
directing a regenerative braking charge current above a charge current threshold of the second battery pack to a separate load rather than to the second battery pack by closing a third switch, and the separate load is different than the load and different than the first battery pack.

11. The method of claim 10, wherein only the second battery pack is discharged in response to the vehicle motive power demand if the state-of-charge of the first battery pack is less than the predetermined minimum threshold state-of-charge.

12. The method of claim 10, further comprising:
terminating the discharging of the first battery pack in response to the vehicle motive power demand when the state-of-charge of the first battery pack falls to the predetermined minimum threshold state-of-charge.

13. The method of claim 10, further comprising:
closing the first switch and opening the second switch when the state-of-charge of the first battery pack is greater than the predetermined minimum threshold state-of-charge.

14. The method of claim 13, further comprising:
closing the second switch only if the state-of-charge of the first battery pack is less than the predetermined minimum threshold state-of-charge.

15. The method of claim 13, further comprising:
opening the first switch when the state-of-charge of the first battery pack is less than the predetermined minimum threshold state-of-charge.

16. The method of claim 13, further comprising:
directing the regenerative braking charge current above the charge current threshold of the second battery pack to the first battery pack rather than to the second battery pack by closing the first switch and opening the second switch.

17. The method of claim 10, wherein:
the first battery pack is configured to provide a maximum driving range of 150 miles, and to charge to an 80 percent state-of-charge in a predetermined amount of time; and
the second battery pack is configured to provide a maximum driving range R:
R=500−1.8*X, where X is a maximum driving range of the first battery pack.

18. The method of claim 10, further comprising:
receiving information indicative of a charging event;
reducing charging current if charging current is above a predetermined value; wherein the predetermined value of the charging current is a current level accepted by the second battery pack; and
charging the first battery pack prior to charging the second battery pack if the state-of-charge of the first battery pack is less than a predetermined maximum state-of-charge.

19. An energy management system for a vehicle, comprising:
a battery system including a first battery pack with a first set of battery cells and a second battery pack with a second set of battery cells; wherein the first battery pack has a relatively high power density in comparison to the second battery pack, and the second battery pack has a relatively high energy density in comparison to the first battery pack;
an electronic controller operatively connected to the battery system and configured to control charging and discharging of the first battery pack and the second battery pack;
wherein the first battery pack and the second battery pack are configured to be separately charged and discharged;
wherein the electronic controller prioritizes charging and discharging of the first battery pack over the second battery pack;
wherein the first battery pack is configured to provide a maximum driving range, and to charge to an 80 percent state-of-charge in a predetermined amount of time; and wherein the second battery pack is configured to provide a maximum driving range R in miles:

R=500−1.8*X, where X is the maximum driving range in miles of the first battery pack.

20. The energy management system of claim 19, wherein X is 150 miles and R is 230 miles.

\* \* \* \* \*